US009882940B2

(12) United States Patent
Hang et al.

(10) Patent No.: US 9,882,940 B2
(45) Date of Patent: Jan. 30, 2018

(54) METHOD FOR LOGGING IN A WEBSITE HOSTED BY A SERVER BY MULTI-ACCOUNT AND THE CLIENT (75) Inventors: Cheng Hang, Beijing (CN); Kuan Jiang, Beijing (CN); Yong Wan, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 666 days.

(21) Appl. No.: 14/004,191

(22) PCT Filed: Feb. 20, 2012

(86) PCT No.: PCT/CN2012/071344
§ 371 (c)(1),
(2), (4) Date: Sep. 10, 2013

(87) PCT Pub. No.: WO2012/122867
PCT Pub. Date: Sep. 20, 2012

(65) Prior Publication Data
US 2014/0006619 A1    Jan. 2, 2014

(30) Foreign Application Priority Data
Mar. 11, 2011 (CN) .......................... 2011 1 0058806

(51) Int. Cl.
*G06F 15/16* (2006.01)
*H04L 29/06* (2006.01)
(Continued)

(52) U.S. Cl.
CPC .......... *H04L 65/1066* (2013.01); *G06F 21/41* (2013.01); *H04L 67/142* (2013.01); *H04L 63/0807* (2013.01)

(58) Field of Classification Search
CPC . G06F 21/41; H04L 63/0807; H04L 65/1066; H04L 65/1069; H04L 678/14; H04L 678/141; H04L 678/142
See application file for complete search history.

(56) References Cited

U.S. PATENT DOCUMENTS

2003/0101343 A1* 5/2003 Eaton .................... H04L 12/581
713/170
2003/0149900 A1* 8/2003 Glassman ............... G06F 21/31
726/6
(Continued)

FOREIGN PATENT DOCUMENTS

CN      1829202 A       9/2006
CN     101072103        11/2007
(Continued)

OTHER PUBLICATIONS

International Search Report for PCT/CN2012/071344.
(Continued)

*Primary Examiner* — Lance L Barry
(74) *Attorney, Agent, or Firm* — Troutman Sanders LLP (57) ABSTRACT The present provides a method for logging in a website hosted by a serve by multi-account and the client. The method comprises: when logging into the server using the second account, a browser: receiving, from the user, login information of the user's second account generating authority request information of the second account based on the login information of the user's second account; saving the authority request information of said second account in a local system directory of the browser separately from authority request information of a first account that has logged into said server; transmitting the authority request information of the second account, via the Internet, to the server; and after receiving, via the Internet, identification information returned from said server for identifying said
(Continued)

second account, the browser saving said identification information in the local system directory of the browser separately from corresponding identification information of the first account.

20 Claims, 4 Drawing Sheets

(51) Int. Cl.
*G06F 21/41* (2013.01)
*H04L 29/08* (2006.01)

(56) References Cited

U.S. PATENT DOCUMENTS

| | | | |
|---|---|---|---|
| 2006/0075224 A1* | 4/2006 | Tao | G06F 21/121 713/164 |
| 2007/0110046 A1* | 5/2007 | Farrell | H04L 69/04 370/389 |
| 2010/0190526 A1* | 7/2010 | Marks | H04W 88/02 455/558 |
| 2011/0125565 A1* | 5/2011 | MacIlwaine | G06Q 30/02 705/14.17 |
| 2013/0138755 A1* | 5/2013 | Lu | H04L 51/00 709/206 |

FOREIGN PATENT DOCUMENTS

| | | |
|---|---|---|
| CN | 101072103 A | 11/2007 |
| CN | 101136915 A | 3/2008 |
| CN | 101170569 A | 4/2008 |
| CN | 101414906 A | 4/2009 |
| KR | 20030050688 A | 6/2003 |

OTHER PUBLICATIONS

Yu Hongchun, Aug. 31, 2008: Cookie-based authentication system for web services, Journal of Tianjin University of Technology, vol. 24, No. 4, Aug. 2008, pp. 42-44.

Home of Win7, Feb. 8, 2010: Using IE8 browser to easily achieve multi-user logging in the same website, <http://www.win7china.com/html/4788.html>, last accessed Apr. 19, 2016.

Home of Windows7, Feb. 23, 2010: Using IE8 browser to easily log in multi-account in the same browser, <http://tech.sina.com.cn/s/2010-02-23/09203872171.shtml>, last accessed Apr. 19, 2016.

* cited by examiner

METHOD FOR LOGGING IN A WEBSITE HOSTED BY A SERVER BY MULTI-ACCOUNT AND THE CLIENT

FIELD OF THE INVENTION

The present application relates to an Internet technology, in particular to a method for logging in by multi-account and the client.

BACKGROUND OF THE INVENTION

With the rapid development of network technologies, more and more people become to use the network to receive and send mails, log into personal spaces, play online games, log into a forum, and so on.

But if a user wants to user two or more accounts to log into websites of the same address simultaneously, there is no corresponding technology to realize this so far. For example, it is impossible to use two different accounts to simultaneously log into a mail box of the same website address at present, and the reasons are as follows:

When a user uses an account to log into a website for the first time, a local client (e.g. browser) will produce a cookie and cache for recording the log-in information of said account, then send said cookie to a server of the website that the account wants to access. Said server verifies whether the account name and password are correct according to the cookie recording the account log-in information and then returns the corresponding acknowledgement information to said client. Said client enables said first account to log into the corresponding website based on said acknowledge information.

If said user uses another account to simultaneously log into said website, said client will check whether there are any cookie and cache logged into said website in said client locally, if there are corresponding cookie and cache, they will be sent to the server, if the server verifies through said cookie and cache that the account name and password are correct, it sends the acknowledge information to the client. Said client will re-use said first account to log into the corresponding website based on said acknowledge information. The reason for this is that the existing clients only store and use one account for the purpose of making management of local log-in accounts convenient, so at the time of re-login, the client will send the cookie of the first account log-in information to the server.

In practical application, in addition to the above-mentioned example of logging into a mail box by multiple accounts, many applications involving user log-in have the problem concerning log-in by multi-account. In summary, there is no technology for logging in by multi-account at present to meet various needs of users.

SUMMARY OF THE INVENTION

The present application provides a method and client enabling multiple accounts to log in simultaneously.

According to a first aspect, the present invention provides a method for logging in by multi-account. When logging into the server using a second account, authority request information of said second account is saved in the client separately from the authority request information of the first account that has logged into said server; and when identification information returned from said server for identifying said second account is received, said identification information is saved in the client separately from the corresponding identification information of the first account.

Preferably, said separate saving is realized by saving the authority request information and/or identification information of the second account in a different directory or different folder from the authority request information and/or identification information of the first account.

Preferably, said separate saving is realized by allocating the second account and the first account to different processes.

Preferably, said authority request information and identification information are stored in the formed of cookie and/or cache.

Preferably, said authority request information includes the user's account name and password.

Preferably, said identification information includes information for identifying the current account in the server.

Preferably, said separate saving is realized by a re-directing technology.

More preferably, the authority request information and/or identification information of the second account is redirected by a hook or drive technology.

Preferably, after logging into the same server using the second account and the first account at said client, update of contents of the corresponding accounts is realized through a redirecting technology.

Preferably, said server is a server corresponding to the information release page for account logging in.

According to a second aspect, the present application provides a client for logging in by multi-account. Said client comprises a authority request information separating module adapted to, when logging into the server using a second account, saving the authority request information of said second account separately from the authority request information of the first account that has logged into the same server, and an identification information separating module adapted to, when receiving the identification information returned from the server for identifying said second account, saving said identification information separately from the corresponding identification information of the first account.

Preferably, said client is a web browser.

Preferably, the separate saving of said authority request information separating module is realized by saving the authority request information of the second account in a different directory or different folder from the authority request information of the first account.

Preferably, the separate saving of said identification information separating module is realized by saving the identification information of the second account in a different directory or different folder from the identification information of the first account.

Preferably, the separate saving of said authority request information separating module is realized by allocating the second account and the first account to different processes.

Preferably, the separate saving of said identification information separating module is realized by allocating the second account and the first account to different processes.

Preferably, the separate savings of said authority request information separating module and said identification information separating module are realized by a re-directing technology.

More preferably, the authority request information and/or identification information of the second account is redirected by a hook or drive technology so as to realize said separate saving.

Preferably, said server is a server corresponding to the information release page for account logging in.

The present application realizes the function of logging in by multi-account by saving the authority request information of an account and the identification information for identifying the account ID in a web page or network separately from the authority request information and identification information of another account that has logged into the same website or web page, thus enabling multiple accounts of a user in one website to log in simultaneously. Further, since multiple accounts can log into the same website, contents of each account can be obtained in time, thus facilitating the user to view contents in different accounts in time. The present application meets the user's need of logging in by multi-account.

BRIEF DESCRIPTION OF THE DRAWINGS

The specific embodiments of the present application will be described in further detail below with reference to the drawings, in which.

DETAILED DESCRIPTION OF THE INVENTION

In practical application, if it is not possible to use two or more accounts to log into websites of the same address simultaneously, many problems will rise. For example, a user has two private mail boxes having the same domain name, when he wants to see if these two mail boxes have new mails, he must log in one of the mail boxes first and then log in said mail box using another account after exiting said mail box, so the operations are complicated and the two private mail boxes of the same domain name cannot be logged in simultaneously. Further, such a mail box logging in method cannot save simultaneous updates to more than two mail boxes simultaneously.

Another example is that when a forum is in the process of establishing and a staff member wants to log into said forum as both an administrator and a common subscriber to test the forum to see if it has errors, but up till now, there is no corresponding technology available to solve problems like this.

With respect to the above-mentioned problems, an embodiment of the present application provides a method for logging in by multi-account, the implementation of which mainly includes the following two aspects:

first, when logging into the server using the second account, saving the authority request information of said second account in the client separately from the authority request information of the first account that has logged into the same server;

second, after receiving the identification information returned from said server for identifying said second account, saving said identification information in the client separately from the corresponding identification information of the first account.

Wherein, said authority request information and identification information will be explained in detail in the embodiments to be described.

Specifically, said server refers to the server corresponding to the information release page for account logging in. In other words, in the embodiment of the present application, different information release pages for account logging in corresponding to different servers. Wherein, said information release pages for account logging in usually refers to the log-in page of a website or system. Further, said server may also be a server corresponding to a website or web page.

Said client may refer to a machine or device through which the user logs into the server, or it may more specifically refer to various software or hardware installed in the machine or device, such as the browser as mentioned below.

It shall be noted that to realize logging in by multi-account, the client saves the authority request information of the first account separately from the authority request information of the second account, and the client also saves the identification information of the first account separately from the identification information of the second account. Thus when the client requests to log into a server corresponding to the same website or web page using the second account, because of the separate saving, the client will not send the authority request information of the first account to the server when inspecting whether there is any authority request information logged into the same servers locally, but it will send the authority request information of the second account to the server to be verified, thus realizing logging in by multi-account.

As for the server, the database connected to the server differentiates and stores log-in information of each account by means of IDs of different accounts, including the identification information returned to the client. That is, one account ID stores the identification information of said account, and the other account ID correspondingly stores the identification information of said other account. In other words, in the application of account logging in, the server usually does not pay much attention to which clients the account information stored in the database correspond to, but the existing client stores and uses only one account for the purpose of making management of the locally logged in accounts conveniently, so the client has the problem of logging in by multi-account. The embodiment of the present application solves this problem by saving separately in the client. But the present application does not exclude that the server might pay attention to which clients the account information stored in the database correspond to in other applications based on some special needs.

In addition, it shall be noted that the above-mentioned first account and second account are general names, which can be understood in the following cases:

1) in the case of logging in using two accounts, the first account and the second account may respectively refer to an account;

2) in the case of logging in using more than two accounts, the first account generally refers to all accounts that have logged into the same server, and the second account generally refers to the newly logged in accounts. For example, a user uses account A and account B in succession to log into the same server, and then uses account C to log into said server, in this case, the first account refers to account A and account B, and the second account refers to account C, the authority request information of account C needs to be saved separately from the authority request information of account A and account B, and the identification information of account C also needs to be saved separately from the identification information of account A and account B. If said user then uses another account D to log into the same server, then the first account refers to account A, account B and account C, and the second account refers to account D.

In summary, no matter in which one of the above-mentioned cases, the first account and second account may refer to different accounts or refer to the same account, which are all within the protection scope of the present application.

Based on the above contents, detailed descriptions are given below in conjunction with embodiments of FIG. 1 and FIG. 2.

Figure 1:
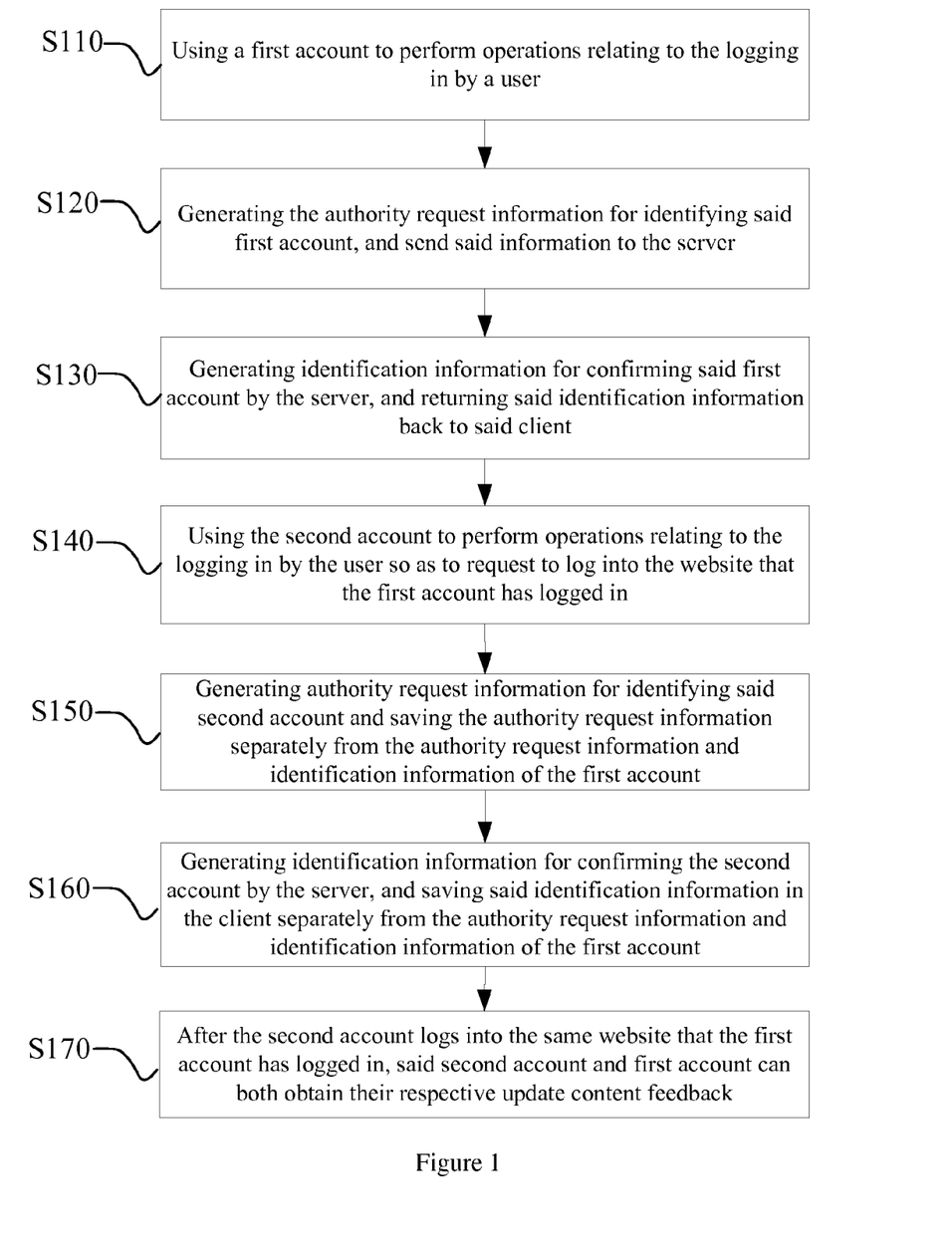
FIG. 1 is a flow chart of a method for logging in by multi-account according to one embodiment of the present application.

FIG. 1 is a flow chart of a method for logging in by multi-account according to one embodiment of the present application.

In step 110, a user uses a first account to perform operations relating to the logging in to request logging into the corresponding website or web page; wherein said website or web page is an information release page, such as a mail box page, a blog page, a micro blog page, a forum page, etc.

In one example, the logging in by multi-account is realized by a browser. However, the present application is not limited to realizing it using a browser, any management software, browser plug-in, and the like that can realize logging in by multi-account should be within the protection scope of the present application, but they will not be illustrated one by one herein.

In step 120, the authority request information for identifying said first account is generated, and said authority request information is sent to the server; wherein said server is the server of the website (or web page) that the first account requests to log into.

Wherein, said authority request information may be information stored in the form of cookie and/or cache. In an example, said authority request information is a cookie and/or cache containing the account name and password of the first account.

A cookie or sometimes cookies refer to (usually encrypted) data stored on local terminals of users for identifying the users' IDs and performing session tracking by some websites.

In step 130, said server receives the authority request information from said server and generates identification information for confirming said first account, and then said identification information is returned back to said client.

Wherein, said identification information may also be stored in the form of a cookie and/or cache. Said identification information includes information for identifying the current account in said server.

In an example, said identification information is a cookie and/or cache containing a session id and the like for conforming information of said first account.

In computer terminology, especially in network application, Session refers to a time interval of communication between a terminal user and an interaction system, and it usually refers to a time duration from registering to enter into the system to canceling to leave the system, and possibly including a certain operating space, if necessary. A Session in a Web refers to the time duration from entering into a website to closing the browser when a user is browsing the website, namely, the time spent by the user for browsing the website. It can be seen from the above definitions that Session is actually a specific time concept. It shall be noted that the concept of a Session needs to include a specific client, a specific server end and a continuous operating time. The Session in which user A establishes connection to server C is different from the Session in which user B establishes connection to server C.

In step 140, the user uses the second account to perform operations relating to website logging in, and said website is the same one as the website logged in by the first account. That is to say, the second account requests to log into the same website as the first account does, i.e. logging in by multi-account is requested.

In step 150, the client identifies from such information as the second account name, the URL and the session id that the log-in is a log-in by multi-account, so the client saves the authority request information it has generated for identifying the second account separately from the authority request information and identification information of the first account, and then sends the authority request information of the second account to the server.

Likewise, said authority request information can be information stored in the form of a cookie and/or cache.

In an example, the authority request information of the second account is a cookie and/or cache containing the account name and password of the second account.

In step 160, the server generates identification information for confirming the second account, and said identification information is saved separately from the authority request information and identification information of the first account in the client.

The server will send the generated identification information to the client which then saves the identification information of the second account separately from the authority request information and identification information of the first account. Of course, based on some special needs, the server may save information of the first account and the second account separately in the same way as that used by the client.

Similarly, the identification information may also be stored in the form of a cookie and/or cache. Said identification information includes information for identifying the current account in the server. In an example, said identification information is a cookie and/or cache containing a session id and the like for confirming the first account information.

In the above flow, it is necessary to guarantee that the authority request information of the first account is saved separately from the authority request information of the second account, and that the identification information of the first account is saved separately from the identification information of the second account. Several specific ways of implementation of the separate saving are given below:

In one example, said separate saving is saving the authority request information and identification information of the first account in a different directory or folder from the authority request information and identification information of the second account.

In another example, said separate saving is realized by allocating the first account and the second account to different processes.

Specifically, a user starts a process and uses a first account to log into a website, and the authority request information in said process is saved in a first directory. Then, said user starts another process and uses a second account to log into the same website. At this time, the authority request information in said process needs to be saved in another directory.

Preferably, said separate saving is realized through a re-directing technology. Specifically, the authority request information and/or identification information of the second account are re-directed by a HOOK or drive technology, thereby realizing said separate saving.

In step 170, after the second account logs into the same website (server) that the first account has logged in, said second account and first account can both obtain their respective update content feedback. Preferably, the content update of the corresponding account is realized through the re-directing technology.

Figure 2:
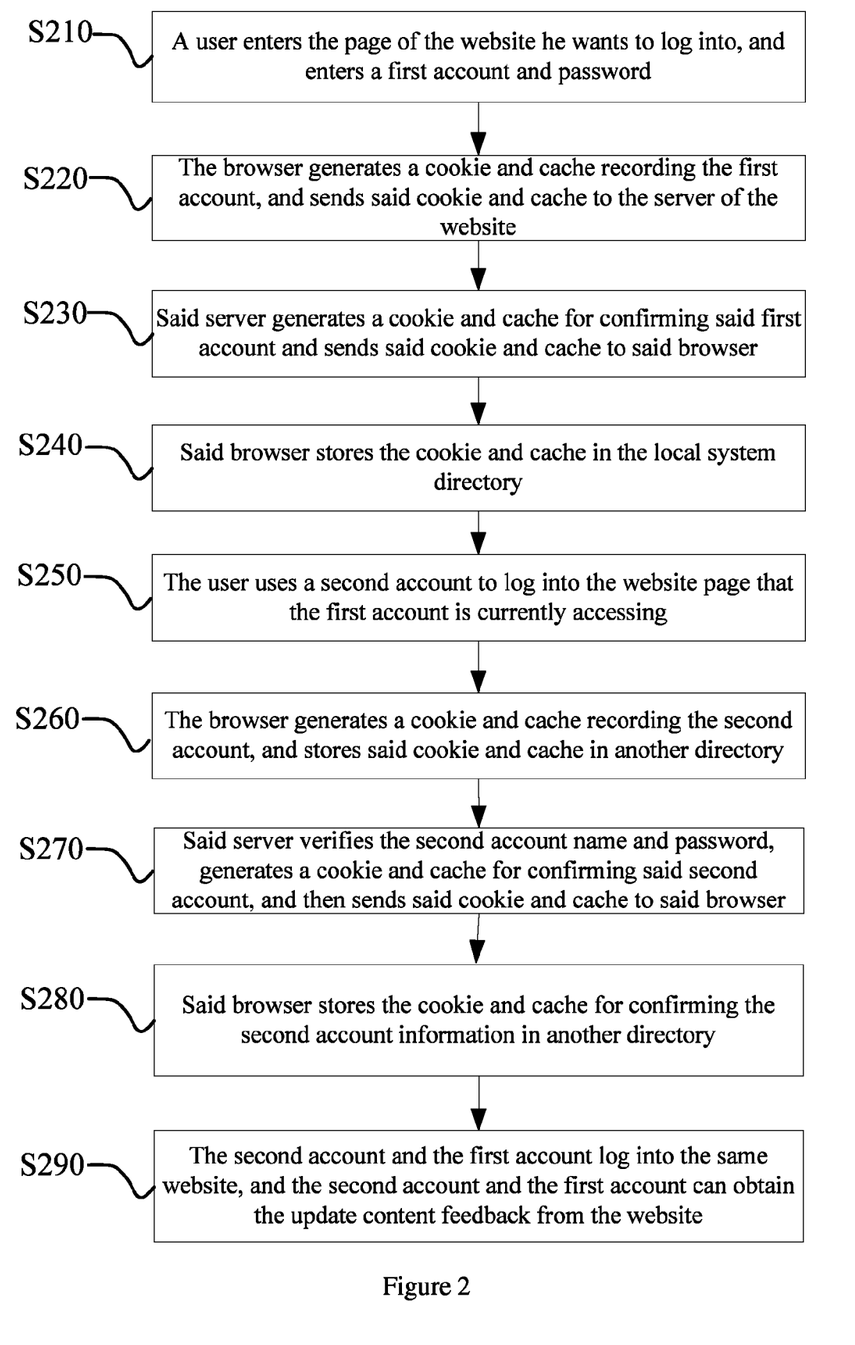
FIG. 2 is a flow chart of a method for logging in by multi-account based on a browser according to one embodiment of the present application.

FIG. 2 is a flow chart of a method for logging in by multi-account based on a browser according to one embodiment of the present application.

In step 210, a user opens a process in a browser, enters the page of the website he wants to log into, and then enters a first account, a first password and clicks the log-in button.

In step 220, the browser generates a cookie and cache recording the log-in information of said first account, said cookie and cache containing such log-in information as the first account name, the first password and the URL, then it sends said cookie and cache to the server of the website that the user wants to visit and sends an HTTP request to said server at the same time to request to log into said website, such as logging into a personal space, a personal mail box, a forum website.

In an example, the cookie generated by said browser is stored in a local system directory of said browser. Generally, the system directory storing said cookie in the Windows operating system is: C:\Documents and Settings\Administrator\Local Settings\Temporary Internet Files.

In step 230, said server verifies whether the first account name and first password are correct based on the cookie and cache from said browser, and then generates a corresponding cookie and cache for confirming said first account information, and sends said newly generated cookie and cache to said browser.

In step 240, said browser stores the cookie and cache from the server in the local system directory, and then the first account logs into the corresponding website, so that it can obtain the update content feedback from said website.

In step 250, the user opens another process in the browser and uses a second account to log into the website page that the first account is currently accessing.

In step 260, the browser generates a cookie and cache recording log-in information of the second account, and stores said cookie and cache in another directory of the local system directory, that is, said directory is different from the directory storing the corresponding cookie and cache of the first account so as to realize separate saving. Then, the browser sends the cookie and cache recording the log-in information of the second account to the website server and sends an HTTP request to said server at the same time to request to log into said website.

In step 270, said server verifies whether the second account name and password are correct based on the cookie and cache recording the log-in information of said second account from said browser, and then generates a corresponding cookie and cache for confirming said second account information, and sends said newly generated cookie and cache to said browser.

In step 280, said browser stores the cookie and cache that are from the server and are used for confirming the second account information in another directory of the local system directory, and said directory is different from the directory storing the corresponding cookie and cache of the first account, namely, separate saving is realized.

In step 290, the second account and the first account log into the same website, and both the second account and the first account can obtain the update content feedback from the website, said update contents are, for example, receiving a new mail, posting a new article, forum reply, posting of panic buying information, etc.

Preferably, the content update of the corresponding account is realized through a re-directing technology.

It shall be noted that FIG. 2 uses the logging in of only two accounts as an example to make the illustration, but in fact, the present application can realize simultaneous logging of more than two accounts into the server corresponding to the same website or web page.

Figure 3:
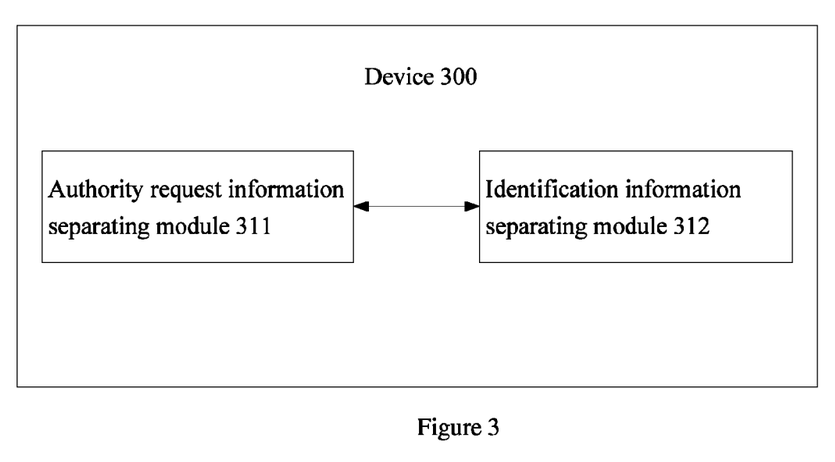
FIG. 3 is a schematic drawing of a device for logging in by multi-account according to one embodiment of the present application.

FIG. 3 is a schematic drawing of a device for logging in by multi-account according to one embodiment of the present application. Said device 300 comprises an authority request information separating module 311 and an identification information separating module 312. In one example, said device 300 is a web browser (i.e. web page browser). In another example, said device 300 may be a part of a browser, i.e. a means or module included in a browser.

Said authority request information separating module 311, upon a user logging into a server corresponding to a website or web page using a second account, saves the authority request information of said second account separately from the authority request information of the first account that has logged into the same website or web page server. Wherein, said website or web page is an information release page for account log-in.

In one example, said separate saving is realized by saving the authority request information of the second account in a different directory or different folder from the authority request information of the first account.

In another example, said separate saving is realizes by allocating the second account and the first account to different processes.

Said identification information separating module 312, after receiving the identification information returned from the website or web page server for identifying said second account, saves said identification information separately from the corresponding identification information of the first account in the client.

In one example, said separate saving is realized by saving the identification information of the second account in a different directory or different folder from the identification information of the first account.

In another example, said separate saving is realizes by allocating the second account and the first account to different processes.

Preferably, the separate saving in said authority request information separating module 311 and said identification information separating module 312 is realized by a re-directing technology. Further, the authority request information and/or identification information of the second account is redirected by a hook or drive technology so as to realize said separate saving.

Figure 4:
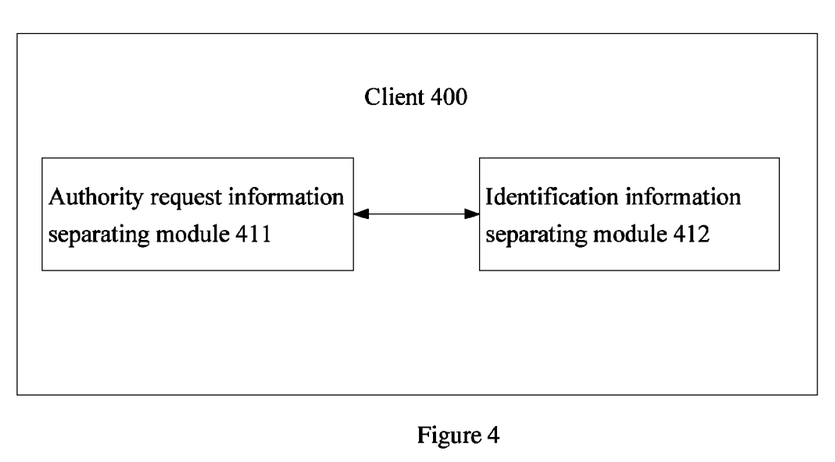
FIG. 4 is a schematic drawing of a client for logging in by multi-account according to one embodiment of the present application.
Figure 5:
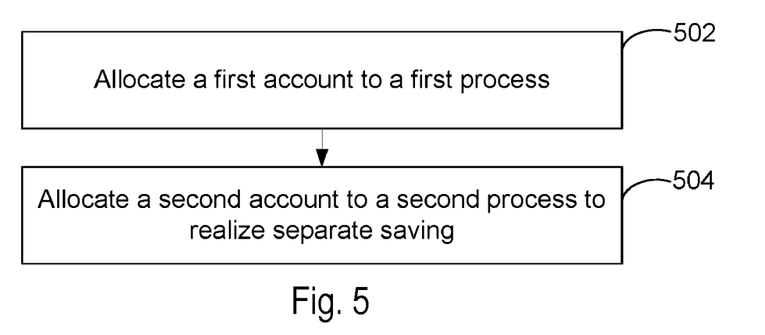
FIG. 5 is a flow chart of a method for separate saving of the authority request information or the identification information including steps 502 and 504.
Figure 6:
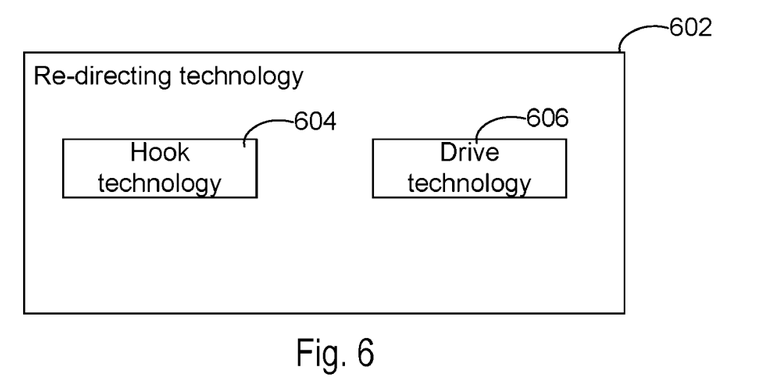
FIG. 6 is a block diagram of re-directing technology 602 including hook technology 604 and drive technology 606.
Figure 7:
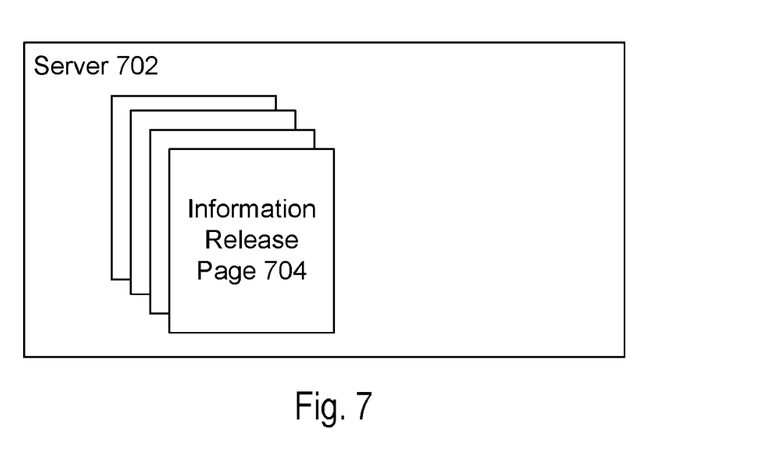
FIG. 7 is a block diagram of a server 702 including information release page 704.

The present application also provides an embodiment of a client for logging in by multi-account. Referring to FIG. 4, which is a schematic drawing of a client for logging in by multi-account according to one embodiment of the present application. Said client 400 for logging in by multi-account comprises an authority request information separating module 411 and an identification information separating module 412. For corresponding descriptions of these two modules, reference can be made to the descriptions about FIG. 3.

It shall be noted that said client 400 for logging in by multi-account can be a relevant entity applied to a computer, such as hardware, combination of hardware and software, software or software in execution. Therefore, said client 400 can be a web browser or a hardware entity including the web browser.

Based on the above contents, the present application also provides a computer readable recording medium recording a program for executing said method for logging in by multi-account. Wherein, details of said method for logging in by multi-account can be found in the descriptions about the embodiments of FIGS. 1 and 2.

Said computer readable recording medium includes any mechanism for storing or transmitting information in a machine (e.g. computer) readable form. For example, the machine readable medium includes a read-only memory (ROM), a random access memory (RAM), a disc storage medium, an optical storage medium, a flash storage medium, and electrical, optical, acoustic or other forms of propagation signals (e.g. carrier, infrared signal, digital signal, etc.).

It shall be noted that the present application is not limited to be used only in a PC (personal computer), but it can also be used in various electronic devices like a PDA, a mobile phone. In addition, the information transmission mode in the present application can be a wired mode or a wireless mode.

The present application can be described in a general context of a computer executable instruction executed by a computer, such as a program module. Generally, the program module includes a routine, program, object, component, data structure and the like for running a specific task or realizing a specific abstract data type. The present application may also be implemented in distributed computing environments in which tasks are run by remote processing devices that are connected through a communication network. In the distributed computing environment, the program module can be located in local and remote computer storage mediums including storage devices.

Finally, it shall also be noted that in this text, such terms of relation as first and second are merely used for differentiating one or some entities or operations from another or other entities or operations, but they do not necessarily request or suggest that these entities or operations should have any of such actual relation or sequence.

Moreover, the wording "and/or" in the above text indicates that this document includes both the "and" relation and the "or" relation, wherein, if solution A and solution B is of an "and" relation, it means that an embodiment may include solution A and solution B simultaneously; if solution A and solution B is of an "or" relation, it means that an embodiment may include solution A solely or include solution B solely.

Obviously, the present application as described herein can be varied in many ways without departing from the true spirit and scope of the present application. Hence, all changes obvious to those skilled in the art shall be included in the scope covered by the claims. The claimed scope of the present application is defined only by the claims.

The invention claimed is:

1. A method for logging in a web site hosted by a server by multi-account, the server storing a first account and a second account associated with a user, comprising:
when logging into the server using the second account, a browser:
receiving, from the user, login information of the user's second account;
generating authority request information of the second account based on the login information of the user's second account;
saving the authority request information of said second account in a local system directory of the browser separately from authority request information of a first account that has logged into said server;
transmitting the authority request information of the second account, via the Internet, to the server; and
after receiving, via the Internet, identification information returned from said server for identifying said second account, the browser saving said identification information in the local system directory of the browser separately from corresponding identification information of the first account.

2. The method for logging in a website hosted by a server by multi-account according to claim 1, wherein said separate saving is realized by saving the authority request information and/or identification information of the second account in a different directory or different folder from the authority request information and/or identification information of the first account.

3. The method for logging in a web site hosted by a server by multi-account according to claim 1, wherein said separate saving is realized by allocating the second account and the first account to different processes.

4. The method for logging in a website hosted by a server by multi-account according to claim 1, wherein said authority request information and identification information are stored in the form of a cookie and/or stored in cache.

5. The method for logging in a website hosted by a server by multi-account according to claim 1, wherein said authority request information includes the user's account name and password.

6. The method for logging in a website hosted by a server by multi-account according to claim 1, wherein said identification information includes information for identifying the current account in the server.

7. The method for logging in a website hosted by a server by multi-account according to claim 1, wherein said separate saving is realized by a re-directing technology.

8. The method for logging in a website hosted by a server by multi-account according to claim 7, wherein the authority request information and/or identification information of the second account is redirected by a hook or drive technology.

9. The method for logging in a website hosted by a server by multi-account according to claim 1, wherein after logging into the same server using the second account and the first account at the browser, update of contents of the corresponding accounts is realized through a redirecting technology.

10. The method for logging in a website hosted by a server by multi-account according to claim 1, wherein said server is a server corresponding to the information release page for account logging in.

11. A client for logging in a website hosted by a server by multi-account, the server storing a first account and a second account associated with a user, comprising:
a memory having instructions stored thereon;
a processor configured to execute the instructions to perform following operations:
when logging into the server using the second account, receiving, from the user, login information of the user's second account;

generating authority request information of the second account based on the login information of the user's second account;

saving the authority request information of said second account in a local system directory of the client separately from authority request information of a first account that has logged into the server;

transmitting the authority request information of the second account, via the Internet, to the server; and when receiving, via the Internet, identification information returned from the server for identifying said second account, saving said identification information in the local system directory of the client separately from corresponding identification information of the first account.

12. The client for logging in a website hosted by a server by multi-account according to claim 11, wherein said client is a web browser.

13. The client for logging in a website hosted by a server by multi-account according to claim 11, wherein the separate saving is realized by saving the authority request information of the second account in a different directory or different folder from the authority request information of the first account.

14. The client for logging in a website hosted by a server by multi-account according to claim 11, wherein the separate saving is realized by saving the identification information of the second account in a different directory or different folder from the identification information of the first account.

15. The client for logging in a website hosted by a server by multi-account according to claim 11, wherein the separate saving of the authority request information is realized by allocating the second account and the first account to different processes.

16. The client for logging in a website hosted by a server by multi-account according to claim 11, wherein the separate saving of the identification information is realized by allocating the second account and the first account to different processes.

17. The client for logging in a website hosted by a server by multi-account according to claim 11, wherein the separate saving is realized by a re-directing technology.

18. The client for logging in a website hosted by a server by multi-account according to claim 17, wherein the authority request information and/or identification information of the second account is redirected by a hook or drive technology.

19. The client for logging in a website hosted by a server by multi-account according to claim 11, wherein said server is a server corresponding to the information release page for account logging in.

20. A non-transitory computer readable recording medium having instructions stored thereon that, when executed by at least one processor, cause the at least one processor to perform operations for logging in a website hosted by a server by multi-account, the server storing a first account and a second account associated with a user, comprising:

when logging into the server using the second account,
receiving, from the user, login information of the user's second account;

generating authority request information of the second account based on the login information of the user's second account;

saving authority request information of said second account in a local system directory separately from authority request information of a first account that has logged into said server;

transmitting the authority request information of the second account, via the Internet, to the server; and after receiving, via the Internet, identification information returned from said server for identifying said second account, saving said identification information in the local system directory separately from corresponding identification information of the first account.

* * * * *